United States Patent [19]

Macke

[11] 4,224,215

[45] Sep. 23, 1980

[54] FILLED POLYCARBONATE COMPOSITIONS

[75] Inventor: Gerald F. Macke, Mt. Vernon, Ind.

[73] Assignee: General Electric Company, Pittsfield, Mass.

[21] Appl. No.: 31,993

[22] Filed: Apr. 20, 1979

[51] Int. Cl.² .................. C08L 7/14; C08L 69/00; C08L 83/10
[52] U.S. Cl. .................. 260/37 PC; 525/464
[58] Field of Search .................. 260/824, 37 PC; 525/464

[56] References Cited

U.S. PATENT DOCUMENTS

| | | |
|---|---|---|
| 3,189,662 | 6/1965 | Vaughn . |
| 3,419,634 | 12/1968 | Vaughn .................. 260/824 R |
| 3,419,635 | 12/1968 | Vaughn .................. 260/824 R |
| 3,742,083 | 6/1973 | Bialous .................. 260/824 R |
| 3,819,744 | 6/1974 | Büchner et al. .................. 260/824 R |
| 3,832,419 | 8/1974 | Merritt .................. 260/824 R |
| 3,971,756 | 7/1976 | Bialous et al. .................. 260/824 R X |
| 4,147,707 | 4/1979 | Alewelt .................. 260/37 PC |
| 4,155,898 | 5/1979 | Bapp et al. .................. 260/824 R X |
| 4,161,469 | 7/1979 | Le Grand et al. .................. 260/40 R |

FOREIGN PATENT DOCUMENTS

| | | |
|---|---|---|
| 1136490 | 9/1962 | Fed. Rep. of Germany ...... 260/824 R |
| 940419 | 10/1963 | United Kingdom .................. 260/824 R |

*Primary Examiner*—Sandra M. Person
*Attorney, Agent, or Firm*—Salvatore C. Mitri; William F. Mufatti

[57] ABSTRACT

Filled polycarbonate compositions are disclosed having improved impact properties and which comprise an admixture of a high molecular weight aromatic polycarbonate, a filler, and an organopolysiloxane-polycarbonate block copolymer additive.

13 Claims, No Drawings

FILLED POLYCARBONATE COMPOSITIONS

This invention relates to filled aromatic polycarbonate compositions that have improved impact properties.

BACKGROUND OF THE INVENTION

Polycarbonate polymers are known as being excellent molding materials since products made therefrom exhibit such properties as high impact strength, toughness, high transparency, wide temperature limits (high impact resistance below −60° C. and a UL thermal endurance rating of 115° C. with impact), good dimensional stability, good creep resistance, good flame retardance, and the like.

However, thermoplastic molding compounds such as polycarbonates are costly to produce and one of the more commonly accepted methods used to reduce their cost is to fill the base resin with a relatively inexpensive filler material. While some fillers are compatible with polycarbonate resins and others impart valuable properties to parts molded from polycarbonates, some fillers are not compatible and/or are deleterious to polycarbonates.

Glass fillers are one of the compatible fillers often used with polycarbonate resins, but this type of filler usually adversely affects the impact properties of parts molded from polycarbonates.

SUMMARY OF THE INVENTION

It has now been found that the impact properties of parts molded from filled, high molecular weight, aromatic polycarbonate resins can be improved by mixing the filled polycarbonate resin with an organopolysiloxane-polycarbonate block copolymer additive in amounts of about 0.5–5% by weight, preferably about 1.5–4% by weight and optimumly 2–3% by weight of the polycarbonate resin.

In the practice of this invention, any of the aromatic polycarbonates can be employed that are prepared by reacting a diphenol with a carbonate precursor. Typical of some of the diphenols that can be employed are bisphenol-A [2,2-bis(4-hydroxyphenyl)propane], bis(4-hydroxyphenyl)methane, 2,2-bis(4-hydroxy-3-methylphenyl)propane, 4,4-bis(4-hydroxyphenyl)heptane, 2,2-(3,5,5',5'-tetrachloro-4,4'-dihydroxydiphenyl)propane, 2,2-(3,5,5',5'-tetrabromo- 4,4'-dihydroxydiphenyl)propane, (3,3'-dichloro-4,4'-dihydroxyphenyl)methane. Other halogenated and non-halogenated diphenols of the bisphenol type can also be used such as are disclosed in U.S. Pat. Nos. 2,999,835, 3,028,365 and 3,334,154.

It is possible to employ two or more different diphenols or a copolymer with a glycol or with hydroxy or acid terminated polyester, or with a dibasic acid in the event a carbonate copolymer or interpolymer rather than a homopolymer is desired for use in preparing the aromatic polycarbonate. Blends of any of these materials can also be used to obtain the aromatic polycarbonates.

These diphenols can then be employed to obtain the high molecular weight aromatic polycarbonates of the invention which can be linear or branched homopolymers or copolymers as well as mixtures thereof or polymeric blends and which generally have an intrinsic viscosity (IV) of about 0.40–1.0 dl/g as measured in methylene chloride at 25° C.

The carbonate precursor used can be either a carbonyl halide, a carbonate ester or a haloformate. The carbonyl halides can be carbonyl bromide, carbonyl chloride and mixtures thereof. The carbonate esters can be diphenyl carbonate, di-(halophenyl)carbonates such as di-(chlorophenyl)carbonate, di-(bromophenyl)carbonate, di-(trichlorophenyl)carbonate, di-(tribromophenyl)carbonate, etc., di-(alkylphenyl)carbonate such as di-(tolyl)carbonate, etc., di-(naphthyl)carbonate, di-(chloronaphthyl)carbonate, phenyl tolyl carbonate, chlorophenyl chloronaphthyl carbonate, etc., or mixtures thereof. The haloformates that can be used include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid such as are disclosed in U.S. Pat. No. 3,169,121 which is incorporated herein by reference, and which are particularly preferred. This class of compounds is generally referred to as copolyestercarbonates.

Molecular weight regulators, acid acceptors and catalysts can also be used in obtaining the aromatic polycarbonates of this invention. The useful molecular weight regulators include monohydric phenols such as phenol, chroman-I, paratertiarybutylphenol, parabromophenol, primary and secondary amines, etc. Preferably, phenol is employed as the molecular weight regulator.

A suitable acid acceptor can be either an organic or an inorganic acid acceptor. A suitable organic acid acceptor is a tertiary amine such as pyridine, triethylamine, dimethylaniline, tributylamine, etc. The inorganic acid acceptor can be either a hydroxide, a carbonate, a bicarbonate, or a phosphate of an alkali or alkaline earth metal.

The catalysts which can be employed are those that typically aid the polymerization of the diphenol with phosgene. Suitable catalysts include tertiary amines such as triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethylammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included herein are branched polycarbonates wherein a polyfunctional aromatic compound is reacted with the diphenol and carbonate precursor to provide a thermoplastic randomly branched polycarbonate. These polyfunctional aromatic compounds contain at least three functional groups which are carboxyl, carboxylic anhydride, haloformyl, or mixtures thereof. Illustrative of polyfunctional aromatic compounds which can be employed include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride and trimellitic acid or their acid halide derivatives.

Blends of linear and branched aromatic polycarbonates are also included within the scope of this invention.

Illustrative of the organopolysiloxane-polycarbonate block copolymers that can be used in the practice of this invention are those such as are described in U.S. Pat. Nos. 3,821,325, 3,419,634, 3,419,635, 3,832,419 and 3,189,662 as well as in copending application Ser. No. 868,023 filed Jan. 9, 1978 and assigned to the same assignee as this application, all of which are incorporated herein by reference.

Thus, the organopolysiloxane-polycarbonate block copolymer employed as the additive herein can be any copolymer comprising organopolysiloxane-polycarbonate blocks having repeating units represented by the general formulae:

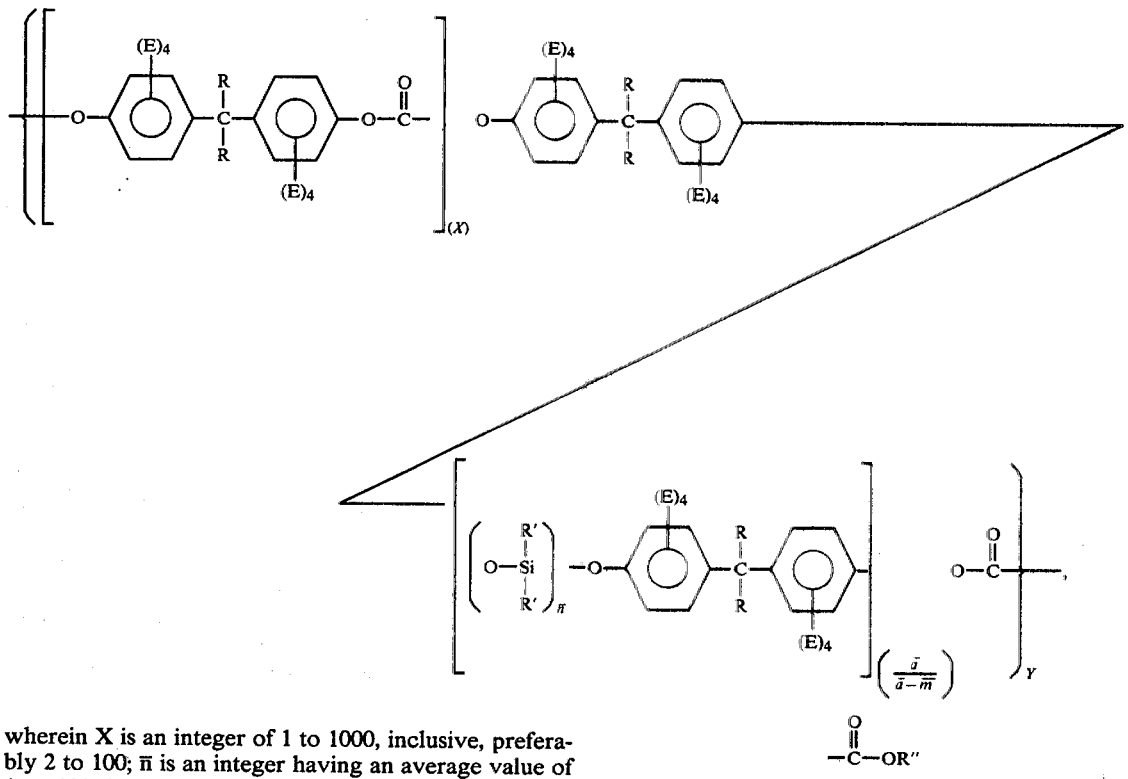

wherein X is an integer of 1 to 1000, inclusive, preferably 2 to 100; $\bar{n}$ is an integer having an average value of 1 to 100, inclusive, preferably 5 to 40; $\bar{a}$ is an integer having an average value of 1.1 to 100; $\bar{m}$ is 1; Y is an integer of 1 to 1000, inclusive, preferably 5 to 12; and E, R, and R' are as defined hereinafter.

Illustrative organopolysiloxane-polycarbonate block copolymers can be represented by the following general formulae:

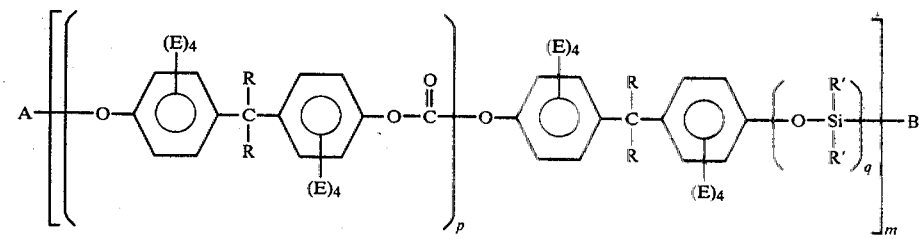

wherein m is at least 1, preferably from 1 to about 1000, inclusive; p is from 1 to about 200, inclusive; q is from about 5 to about 200, inclusive, preferably from about 10 to about 90, inclusive; the ratio of p:q can vary from about 0.005 to about 40, inclusive; B is represented by the formula:

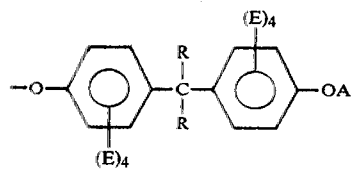

wherein A can be hydrogen and,

IV.

I.

$$-\overset{O}{\underset{\|}{C}}-OR''$$

R is a member selected from the group consisting of hydrogen, monovalent hydrocarbon radicals and halogenated monovalent hydrocarbon radicals; R' is a member selected from the group consisting of monovalent hydrocarbon radicals, halogenated monovalent hydrocarbon radicals and cyanoalkyl radicals; R'' is a member selected from the group consisting of monovalent hydrocarbon radicals and halogenated hydrocarbon radicals; and, E is a member selected from the group consisting of hydrogen, lower alkyl radicals, halogen radicals, and mixtures thereof.

Included within the radicals represented by R in formulae I and II above are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl, including methyl, ethyl propyl, chlorobutyl, cyclohexyl, etc. R can be the same radical or mixtures of the aforementioned radicals, but is preferably methyl. R' includes all of the radicals of R except hydrogen, and can be all the same radical or mixtures of the aforementioned R radicals except hydrogen. R' is also preferably methyl. R' can also include, in addition to the R radicals, except hydrogen, cyanoalkyl radicals such as cyanoethyl, cyanobutyl, etc., radicals. Radicals that are included within the definition of E of formulae I and II are hydrogen, methyl, ethyl, propyl, chloro, bromo, iodo, etc. and mixtures thereof. Preferably, E is hydrogen.

These organopolysiloxane-polycarbonate block copolymers can be prepared by techniques known to those skilled in the art including those described in the U.S. patents and application identified hereinbefore. Accordingly, all of these procedures are incorporated herein by reference.

Preferred organopolysiloxane-polycarbonate block copolymers contain the repeating units of formula I above wherein X, Y, a, n and m are as follows:

| Copolymer "A": | X equals ~ 7 |
| | Y equals ~ 8 to 10 |
| | a equals ~ 2 |
| | n equals ~ 10 |
| | m equals ~ 1 |
| Copolymer "B": | X equals ~ 10 |
| | Y equals ~ 8 to 10 |
| | a equals ~ 2 |
| | n equals ~ 20 |
| | m equals ~ 1 |
| Copolymer "C": | X equals ~ 5 |
| | Y equals ~ 8 to 10 |
| | a equals ~ 2 |
| | n equals ~ 20 |
| | m equals ~ 1 |

Any of the methods well known to those skilled in the art can be employed to prepare the compositions of this invention such as mixing the filled, high molecular weight, aromatic polycarbonate resin and the organopolysiloxane-polycarbonate block copolymer together in powder or granular form and extruding or shaping the mixture into pellets or other suitable forms; dry mixing, hot melt mixing, employing an extruder, a heated mill or other mixing device such as a Banbury mixer, and the like.

PREFERRED EMBODIMENT OF THE INVENTION

The following example is set forth to more fully and clearly illustrate the present invention and is intended to be, and should be construed as being, exemplary and not limitative of the invention. Unless otherwise stated, all parts and percentages are by weight.

EXAMPLE

One hundred (100) parts of an aromatic polycarbonate was prepared by reacting BPA [2,2-bis(4-hydroxyphenyl)propane] and phosgene in the presence of an acid acceptor and a molecular weight regulator. The resultant high molecular weight aromatic polycarbonate had an intrinsic viscosity (IV) of 0.50. This aromatic polycarbonate was subsequently mixed with an organopolysiloxane-polycarbonate block copolymer and commercially obtained chopped glass fibers having an average length of 3/16" in the amounts shown in the Table by tumbling the ingredients together in a laboratory tumbler. In each instance, the resulting mixture was then fed through an extruder which was operated about 265° C. and the extrudate was comminuted into pellets.

The pellets were then injection molded at about 315° C. into test bars of about 5 in. by ½ in. by about 1/16-⅛ in. thick and into test squares of about 2 in. by 2 in. by about ⅛ in. thick. Notched and unnotched impact values of the test samples were determined according to ASTM D-256 and the results obtained are also listed in the Table, wherein the organopolysiloxane-polycarbonate block copolymer is identified as "LR".

TABLE

Impact Properties of Filled Polycarbonates Containing an LR Additive

| Sample | Glass Fibers (wt. %) | LR (wt. %) | Notched Izod (ft. lbs./in.) | Unnotched Izod (ft. lbs./in.) |
|---|---|---|---|---|
| A | 5 | 0 | 1.7 | 40.0 |
| B | 5 | 3 | 8.1 | 40.0 |
| C | 5 | 5 | 8.8 | 40.0 |
| D | 10 | 0 | 2.0 | 16.0 |
| E | 10 | 3 | 6.7 | 33.9 |
| F | 10 | 5 | 6.7 | 38.3 |
| G | 20 | 0 | 2.7 | 7.0 |
| H | 20 | 3 | 4.7 | 16.5 |
| I | 20 | 5 | 5.2 | 16.0 |
| J | 30 | 0 | 2.2 | 6.5 |
| K | 30 | 3 | 4.0 | 12.4 |
| L | 30 | 5 | 4.1 | 12.4 |
| M | 40 | 0 | 1.9 | 5.7 |
| N | 40 | 3 | 3.3 | 6.3 |
| O | 40 | 5 | 3.2 | 6.3 |

As the results in the Table reveal, the inclusion of the LR additive; i.e., organopolysiloxane-polycarbonate block copolymer, improves the impact properties of filled aromatic polycarbonate in both notched and unnotched test samples. The improvement is most pronounced at glass fill levels up to about 30 wt. %. This filler level appears to be optimum as inclusion of LR seems to have less of an effect on impact after this filler level has been reached. More importantly, the results in the Table show that aromatic polycarbonates can contain a high level of filler and retain acceptable impact properties by including in the polycarbonates a relatively small amount of an organopolysiloxane-polycarbonate block copolymer additive.

What is claimed is:

1. A filled polycarbonate composition having improved impact properties, said polycarbonate composition comprising an admixture of a high molecular weight aromatic polycarbonate; a filler in an amount of about 5–40% by weight of said polycarbonate; and, an organopolysiloxane-polycarbonate block copolymer additive in an amount of about 0.5–5.0% by weight of said polycarbonate.

2. The polycarbonate composition of claim 1 wherein said filler is present in an amount of about 10–30% by weight.

3. The polycarbonate composition of claim 1 wherein said filler is chopped glass fibers and is present in an amount of about 15–25% by weight.

4. The polycarbonate composition of claim 1 wherein said additive is present in an amount of about 1.5–4.0% by weight.

5. The polycarbonate composition of claim 3 wherein said additive is present in an amount of about 2–3% by weight.

6. The polycarbonate composition of claim 1 wherein said copolymer additive is represented by the general formula:

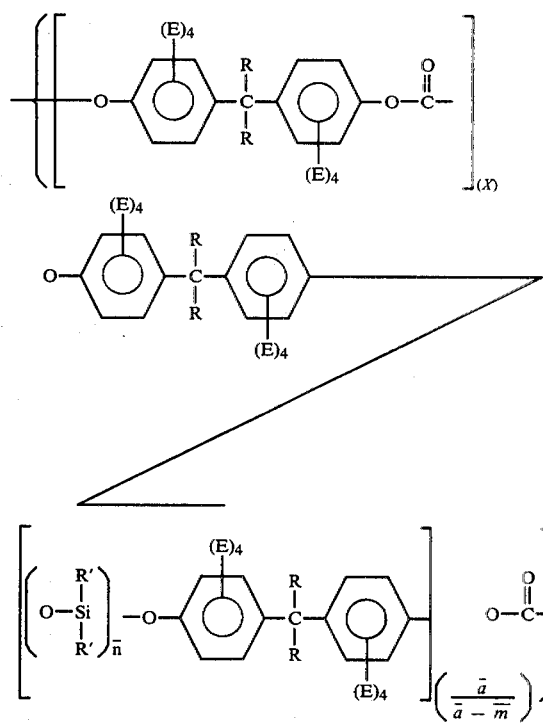

wherein X is an integer of 1 to 1000, inclusive, preferably 2 to 100; $\bar{n}$ is an integer having an average value of 1 to 100, inclusive, preferably 5 to 40; $\bar{a}$ is an integer having an average value of 1.1 to 100; $\bar{m}$ is 1; Y is an integer of 1 to 1000, inclusive, preferably 5 to 12; E is a member selected from the group consisting of hydrogen, lower alkyl radicals, halogen radicals, and mixtures thereof; R is a member selected from the group consisting of hydrogen, monovalent hydrocarbon radicals, and halogenated monovalent hydrocarbon radicals; and, R' is a member selected from the group consisting of monovalent hydrocarbon radicals, halogenated monovalent hydrocarbon radicals and cyanoalkyl radicals.

7. The additive of claim 6 wherein X equals ∼7; Y equals ∼8 to 10; $\bar{a}$ equals ∼2; $\bar{n}$ equals ∼10; and $\bar{m}$ equals ∼1.

8. The additive of claim 6 wherein X equals ∼10; Y equals ∼8 to 10; $\bar{a}$ equals ∼2; $\bar{n}$ equals ∼20; and $\bar{m}$ equals ∼1.

9. A filled polycarbonate composition having improved impact properties, said polycarbonate composition comprising an admixture of a high molecular weight aromatic polycarbonate; chopped glass fibers in an amount of about 10–30% by weight of said polycarbonate; and, an organopolysiloxane-polycarbonate block copolymer additive in an amount of about 1.5–4% by weight of said polycarbonate, said block copolymer additive being represented by the general formula:

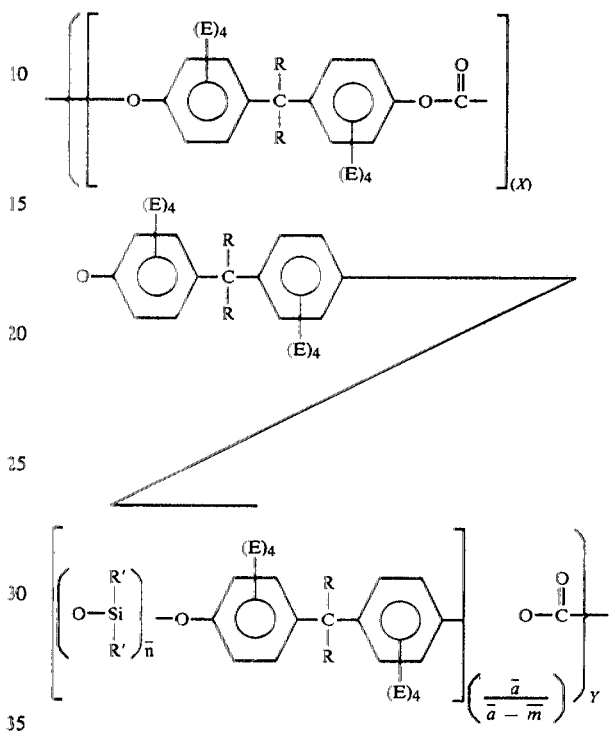

wherein X is an integer of 1 to 1000, inclusive, preferably 2 to 100; $\bar{n}$ is an integer having an average value of 1 to 100, inclusive, preferably 5 to 40; $\bar{a}$ is an integer having an average value of 1.1 to 100; $\bar{m}$ is 1; Y is an integer of 1 to 1000, inclusive, preferably 5 to 12; E is a member selected from the group consisting of hydrogen, lower alkyl radicals, halogen radicals, and mixtures thereof; R is a member selected from the group consisting of hydrogen, monovalent hydrocarbon radicals, and halogenated monovalent hydrocarbon radicals; and, R' is a member selected from the group consisting of monovalent hydrocarbon radicals, halogenated monovalent hydrocarbon radicals and cyanoalkyl radicals.

10. The polycarbonate composition of claim 9 wherein said glass fibers are present in an amount of about 15–25% by weight.

11. The polycarbonate composition of claim 9 wherein said block copolymer additive is present in an amount of about 2–3% by weight.

12. The polycarbonate composition of claim 9 wherein X equals ∼7; Y equals ∼8 to 10; $\bar{a}$ equals ∼2; $\bar{n}$ equals ∼10; $\bar{m}$ equals ∼1.

13. The polycarbonate composition of claim 9 wherein X equals ∼10; Y equals ∼8 to 10; $\bar{a}$ equals ∼2; $\bar{n}$ equals ∼20; and $\bar{m}$ equals ∼1.

* * * * *

UNITED STATES PATENT AND TRADEMARK OFFICE
CERTIFICATE OF CORRECTION

PATENT NO. : 4,224,215
DATED : 9/23/80
INVENTOR(S) : Gerald Fred Macke

It is certified that error appears in the above-identified patent and that said Letters Patent are hereby corrected as shown below:

Column 5, line 29, "a, n and m" should be

--$\bar{a}$, $\bar{n}$ and $\bar{m}$--.

Signed and Sealed this

Twenty-fifth Day of August 1981

[SEAL]

*Attest:*

*Attesting Officer*

GERALD J. MOSSINGHOFF

*Commissioner of Patents and Trademarks*